Patented June 8, 1954

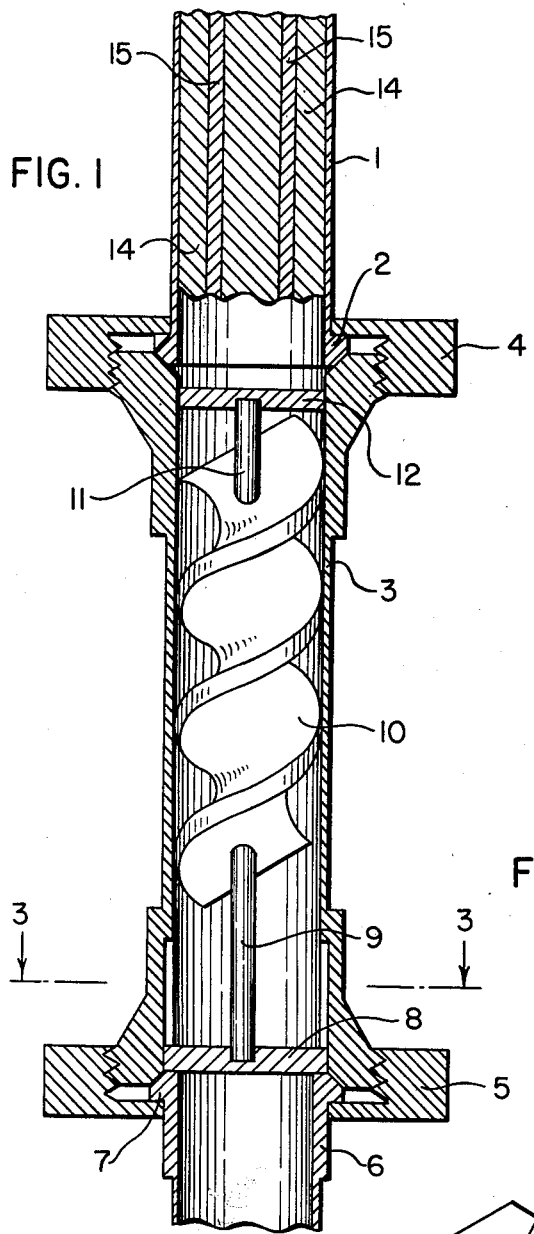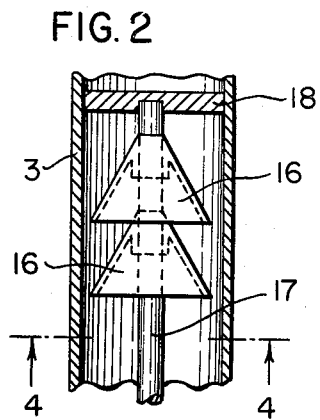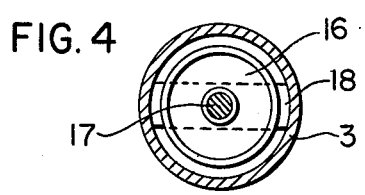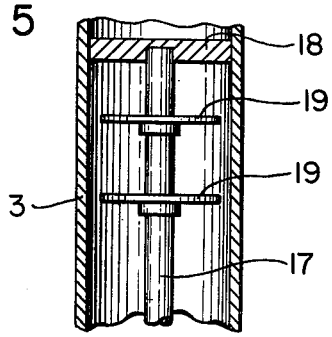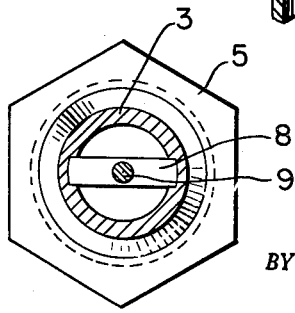

2,680,414

UNITED STATES PATENT OFFICE 2,680,414

MIXING APPARATUS

Gerald G. Balch, Pittsburgh, Pa.

Application April 22, 1950, Serial No. 157,446

3 Claims. (Cl. 107—1)

The object of the present invention is to provide apparatus whereby an ice cream body containing a longitudinally extending and continuous core, or a plurality of cores of a congealed syrup or other flavoring material may be so acted upon as to distribute said flavoring material in disconnected portions of irregular length, although certain of said portions may be closely contiguous. The apparatus is so formed as to have no moving parts.

The invention will be described with reference to the accompanying drawing, in which—

Fig. 1 is a view in sectional elevation showing an embodiment of the invention.

Fig. 2 is a detail fragmentary vertical section taken through the mixing tube and illustrating a modification of the mixing elements.

Fig. 3 is a horizontal section on the line 3—3, Fig. 1.

Fig. 4 is a horizontal section on the line 4—4, Fig. 2 looking in the direction of the arrows.

Fig. 5 is a view similar to Fig. 2 showing a further modification.

Referring to the drawings I have shown at 1 the lower section of a tube which is formed at its base with a flange tube which may be beveled in accordance with a seat formed in the upper end of a tubular casing 3. The two elements are held together by threaded collar 4.

The lower end of tubular casing 3 is threaded to receive a collar 5 which connects that end with a discharge pipe 6. Discharge pipe 6 is formed with a flanged head 7, the upper portion of which is beveled to engage the correspondingly formed seat at the inner wall of tubular casing 3 at the lower end thereof.

The upper horizontal edge of discharge pipe 6 provides an annular seat for a cross-bar 8 which centrally receives the stud or rod-like end 9 of a spiral blade 10. This blade carries at its upper end portion a stud or rod 11 which is fitted within an axial recess in a cross-bar 12.

In carrying out my process I inject into a moving and preferably annular mass of ice cream 14 one or more cores 15 of a flavoring material, chocolate fudge being an example. This moving body with its inwardly positioned flavoring cores will be split by the top cross-bar 12 and the moving body of ice cream, with its flavoring material, will be caused to follow the fixed spiral mixing blade. Because it is so fixed there will be a complex irregular movement of the mass which will break the flavoring core or cores into distributed space sections which are irregular in both length and cross-section. Finally the body will be again split by the cross-bar 8 and will pass into the discharge pipe 6. The obstructions to the moving mass and the splitting thereof by the cross-bar constitutes an important factor in the desired mixing action.

In the modification of Fig. 2 a plurality of conical members 16 are fixed upon a holding rod 17, one end of the rod being seated in a cross-bar 18 similar to that shown at 12 in Fig. 1 cones and cross-bar being mounted in the same tubular casing 3 as shown in the preceding figure. Also the lower cross-bar 8 of that figure will be used as a support for the rod 17. By the arrangement shown in Fig. 2, the ice cream and flavoring mass will be split, then compressed and further split at the periphery of the first cone, then expanded below the first cone and compressed and split at the periphery of the second cone.

In the construction of Fig. 5 the cones are substituted by fixed disks 19, the construction otherwise being the same.

Having described my invention, it will be understood that various modifications may be made in the form and arrangement of the elements illustrated in the drawing without departing from the spirit of the invention.

Having described my invention, what I claim and desire to secure by Letters Patent is as follows:

1. A method of making an ice cream product having distributed therein a plurality of portions of flavoring material of irregular length and configuration, said method comprising the steps of forming ice cream into a tubular mass, providing a core of flavoring material within the interior of said tubular mass of ice cream, breaking up said core into a plurality of portions of irregular length and configuration, and simultaneously therewith distributing said irregular core portions within the ice cream.

2. An apparatus for making an ice cream product having distributed therein a plurality of portions of flavoring material of irregular length and configuration, comprising a longitudinal hollow chamber having an entrance opening at one end and an exit opening at the other end, a pair of transverse bar members each fixedly secured in said chamber adjacent a respective one of said end openings and extending transversely across the interior of the chamber perpendicular to the longitudinal axis thereof, and a longitudinal unitary spiral single blade member the diameter of said blade being substantially the diameter of said chamber extending within and longitudinally of the chamber, said blade member being fixedly secured at its opposite ends to said transverse bar members.

3. The apparatus of claim 2 wherein said spiral blade is provided with fixed end rods centrally disposed in the respective ends of said blade, the respective top and bottom end rods being immovably fixed into said respective top and bottom fixed transverse bar members.

References Cited in the file of this patent

UNITED STATES PATENTS

| Number | Name | Date |
|---|---|---|
| 1,083,275 | Eberhard | Jan. 6, 1914 |
| 2,006,375 | Vogt | July 2, 1935 |
| 2,190,226 | Alexander | Feb. 13, 1940 |
| 2,207,616 | Howser | July 9, 1940 |
| 2,246,871 | Balch | June 24, 1941 |
| 2,260,298 | Cowling | Oct. 28, 1941 |
| 2,313,060 | Friedman | Mar. 9, 1943 |
| 2,334,052 | Wedin | Nov. 9, 1943 |
| 2,389,084 | Routh | Nov. 13, 1945 |
| 2,479,261 | Reetz | Aug. 16, 1949 |